United States Patent
VanDrunen et al.

(10) Patent No.: US 7,521,881 B2
(45) Date of Patent: Apr. 21, 2009

(54) CONSTANT SPEED BARRIER OPERATOR

(75) Inventors: Paul J. VanDrunen, Navarre, FL (US); Jason L. Mamaloukas, Pensacola, FL (US); James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 407 days.

(21) Appl. No.: 11/241,337

(22) Filed: Sep. 30, 2005

(65) Prior Publication Data

US 2007/0075655 A1    Apr. 5, 2007

(51) Int. Cl.
*H02P 7/08* (2006.01)
(52) U.S. Cl. .................. 318/66; 318/466; 318/266
(58) Field of Classification Search ............. 318/66, 318/466, 280, 266
See application file for complete search history.

(56) References Cited

U.S. PATENT DOCUMENTS

| | | | | |
|---|---|---|---|---|
| 4,628,636 A | 12/1986 | Folger | | 49/199 |
| 4,638,433 A | 1/1987 | Schindler | | 364/400 |
| 4,794,731 A | 1/1989 | Willmott et al. | | 49/199 |
| 5,378,861 A | 1/1995 | Barten et al. | | 187/316 |
| 5,929,580 A | 7/1999 | Mullet et al. | | 318/466 |
| 6,118,243 A | 9/2000 | Reed et al. | | 318/468 |
| 6,172,475 B1 * | 1/2001 | Fitzgibbon et al. | | 318/266 |
| 6,263,947 B1 * | 7/2001 | Mullet | | 160/191 |
| 6,326,751 B1 * | 12/2001 | Mullet et al. | | 318/434 |
| 6,326,754 B1 | 12/2001 | Mullet et al. | | 318/480 |
| 6,445,152 B1 | 9/2002 | Calamatas | | 318/445 |
| 6,615,897 B2 * | 9/2003 | Dorma | | 160/191 |
| 6,712,116 B2 * | 3/2004 | Beaudoin et al. | | 160/188 |
| 6,806,665 B2 | 10/2004 | Fitzgibbon et al. | | 318/282 |
| 6,883,579 B2 * | 4/2005 | Olmsted | | 160/189 |

FOREIGN PATENT DOCUMENTS

| | | |
|---|---|---|
| EP | 0 677 475 | 10/1995 |
| WO | WO 00/72436 | 11/2000 |

* cited by examiner

*Primary Examiner*—Lincoln Donovan
*Assistant Examiner*—David S Luo
(74) *Attorney, Agent, or Firm*—Renner Kenner Greive Bobak Taylor & Weber

(57) ABSTRACT

A constant speed barrier operator comprises a controller, a memory unit, a potentiometer, a pulse counter, and a motor control. The potentiometer and pulse counter monitor the position and speed of an access barrier. As the access barrier is moved between open and closed positions the controller samples the position and speed of the access barrier. These samples are used to analyze whether the speed at a given point deviates from a predetermined speed selected for the access barrier. If a variation exists, the controller takes corrective action by changing power settings for the motor for a given access barrier position.

32 Claims, 6 Drawing Sheets

| UPWARD DIRECTION | | | DOWNWARD DIRECTION | | |
|---|---|---|---|---|---|
| Motor Power | Movement Speed | Movement Position | Motor Power | Movement Speed | Movement Position |
| 206 | 208 | 210 | 206 | 208 | 210 |
| Motor Power Value ⋮ | Speed Value ⋮ | Position Value ⋮ | Motor Power Value ⋮ | Speed Value ⋮ | Position Value ⋮ |

FIG-5

CONSTANT SPEED BARRIER OPERATOR

TECHNICAL FIELD

Generally, the present invention relates to a system for detecting, measuring, and controlling the speed and position of an access barrier as it travels between open and closed positions. More specifically, the present invention relates to a system that monitors, updates, and processes stored data in order to move the access barrier at a constant speed. In particular, the present invention relates to a system that utilizes phase control to control the speed of the access barrier.

BACKGROUND

Barrier operators automatically move an access barrier, such as a garage door between open and closed positions. Typically, the open and closed positions of the access barrier are defined by the upper and lower physical limits of the access barrier. For example, the lower limit may be established by the floor upon which the access barrier closes. Whereas, the upper limit may be defined by the highest point the access barrier will travel, which can be limited by the operator, a counterbalance system provided by the barrier operator, or the physical limits of the access barrier's track system. The upper and lower limits are employed to prevent damage to the access barrier that may result from an attempt by the barrier operator to move the access barrier past its physical limits. Under normal operating conditions, the limits of the barrier operator may be set to match the upper and lower physical limits of the access barrier. However, the barrier operator limits are normally set to a point less than the physical upper and lower limits of the access barrier to minimize wear.

Systems used to set operator limits are composed of switches used to terminate travel in the up and down directions. These mechanical switches, which have a limited life span, are adjustable and can be used by the consumer or an installer to "fit" the access barrier travel to a garage opening. Metal fatigue and corrosion are the most likely causes of switch failure. Another drawback of mechanical switches is that they can be wired in series with the motor, which creates high current draw across the switch contacts causing failure. A further limitation of limit switches is that the up and down limits, which must be set manually, can be improperly set or misadjusted.

Other position limit systems employ pulse counters that set the upper and lower travel of the access barrier by counting the revolutions of an operator's rotating component. These pulse counters are normally coupled to the shaft of the motor and provide a count to a microprocessor. The upper and lower limits are programmed into the microprocessor by the consumer or installer. As the access barrier cycles, the pulse counter updates the count to the microprocessor. Once the proper count is reached, which corresponds to the count of the upper and lower limits programmed by the consumer or installer, the access barrier stops.

Prior to being operated, a barrier operator is often configured by its manufacturer to move the access barrier at a predetermined speed. This predetermined speed is established, generally, by setting the amount of output power that is supplied to the drive motor of the barrier operator. However, during the movement of the access barrier resistance is often encountered that decelerates, or slows the movement of the access barrier. Resistance may occur due to a variety of causes, including debris on the track of the access barrier, lack of lubrication between the access barrier and the track, or the gradual wear of the mechanical components that comprise the access barrier and barrier operator. Furthermore, the weight of the access barrier may also serve to amplify any resistance encountered by the access barrier (more so in the upward movement than in the downward movement of the access barrier). Conversely, the movement of the access barrier may be accelerated, should the access barrier encounter a lack of resistance, or if the barrier operator moves from a position of substantial resistance to a position having reduced resistance. Because of the aforementioned acceleration and deceleration, the access barrier may move in a non-uniform, or disjointed manner, rather than in a fluid manner commonly associated with access barriers. As a result, additional stress is placed on the barrier operator, access barrier, and any supporting structures utilized thereby. Additionally, as the barrier operator, access barrier and other supporting structures wear after extended use, the unwanted acceleration/deceleration may become worse.

Typically to overcome the problems associated with the acceleration/deceleration of the access barrier, a system that samples the speed and position of the access barrier in real-time may be employed. By taking samples, the amount of power supplied to the motor of the barrier operator may be decreased or increased if the sampling system detects that the access barrier is respectively accelerating or decelerating at various points throughout the access barrier's movement. However, because the instant system attempts to make the adjustment to the motor power in real-time, overshoot, undershoot, or possibly oscillation in the speed of the access barrier may occur. As a result, a disjointed movement of the access barrier may still occur.

Therefore, there is a need for a constant speed barrier operator that adjusts the amount of power supplied to the motor at the end of an access barrier's movement, so as to provide a constant and uniform access barrier movement. Additionally, there is a need for a constant speed barrier operator that samples the movement of the access barrier, and adjusts the amount of power delivered to the motor of the barrier operator after each cycle of the access barrier's movement. Still yet, there is a need for a constant speed barrier operator that does not create overshoot, undershoot, or generate unwanted oscillation of the access barrier. Furthermore, there is a need for a constant speed barrier operator that utilizes phase control to control the speed of the motor of the barrier operator.

DISCLOSURE OF THE INVENTION

In light of the foregoing, it is a first aspect of the present invention to provide a constant speed barrier operator.

It is another aspect of the present invention to provide a constant speed barrier operator to maintain movement of a barrier, the operator comprising a motor adapted to be linked to the access barrier which moves between limit positions, a detection device associated with one of the motor and the access barrier, the detection device generating at least a position value during movement of the access barrier, and a controller coupled to the motor and receiving and storing the position value and generating a speed value therefrom, the controller maintaining a barrier speed profile and adjusting generation of motor power on subsequent barrier movements to match the maintained barrier speed profile based upon previously generated speed and position values.

Yet another aspect of the present invention is to provide a constant speed barrier operator to monitor the movement of an access barrier so as to maintain the movement of the access barrier at a predetermined speed value, the constant speed barrier operator comprising a controller, a pulse counter coupled to the controller, the pulse counter configured to provide data on the speed of the access barrier, when the access barrier is actuated, a potentiometer coupled to the controller, the potentiometer configured to provide data on the position of the access barrier, when the access barrier is actuated, a memory unit coupled to the controller, the memory unit having an upward array and a downward array, the upward and the downward arrays comprising a movement position sub-array, a motor power sub-array and a movement speed sub-array, the controller sampling the data provided by the potentiometer and pulse counter to generate a position value and a speed value that is associated with the position value, the controller storing both the position value in the movement position sub-array, and the speed value in the movement speed sub-array, wherein the controller compares the speed value with the predetermined setup speed value, if a variation is found, the controller storing an updated motor power value associated with the position value and the speed value in the motor power sub-array.

Still another aspect of the present invention is a method for maintaining the movement of an access barrier at a predetermined setup speed during the movement of an access barrier, the method comprising providing a barrier operator having a memory unit coupled to a controller, creating one or more arrays in the memory unit, sampling the position of the access barrier to generate a position value, determining the speed of the access barrier from the position values obtained at the sampling step, storing the sampled position and speed sample values in the array, comparing the sampled speed values associated with a given position value with a predetermined setup speed value, and adjusting a motor power value associated with a given position sample value if the sample speed value does not match the predetermined setup speed value.

BRIEF DESCRIPTION OF THE DRAWINGS

These and other features and advantages of the present invention will become better understood with regard to the following description, appended claims, and accompanying drawings wherein:

FIG. 5 is an elevational view of the upward and downward arrays created in the memory unit, according to the concepts of the present invention.

BEST MODE FOR CARRYING OUT THE INVENTION

Figure 1:
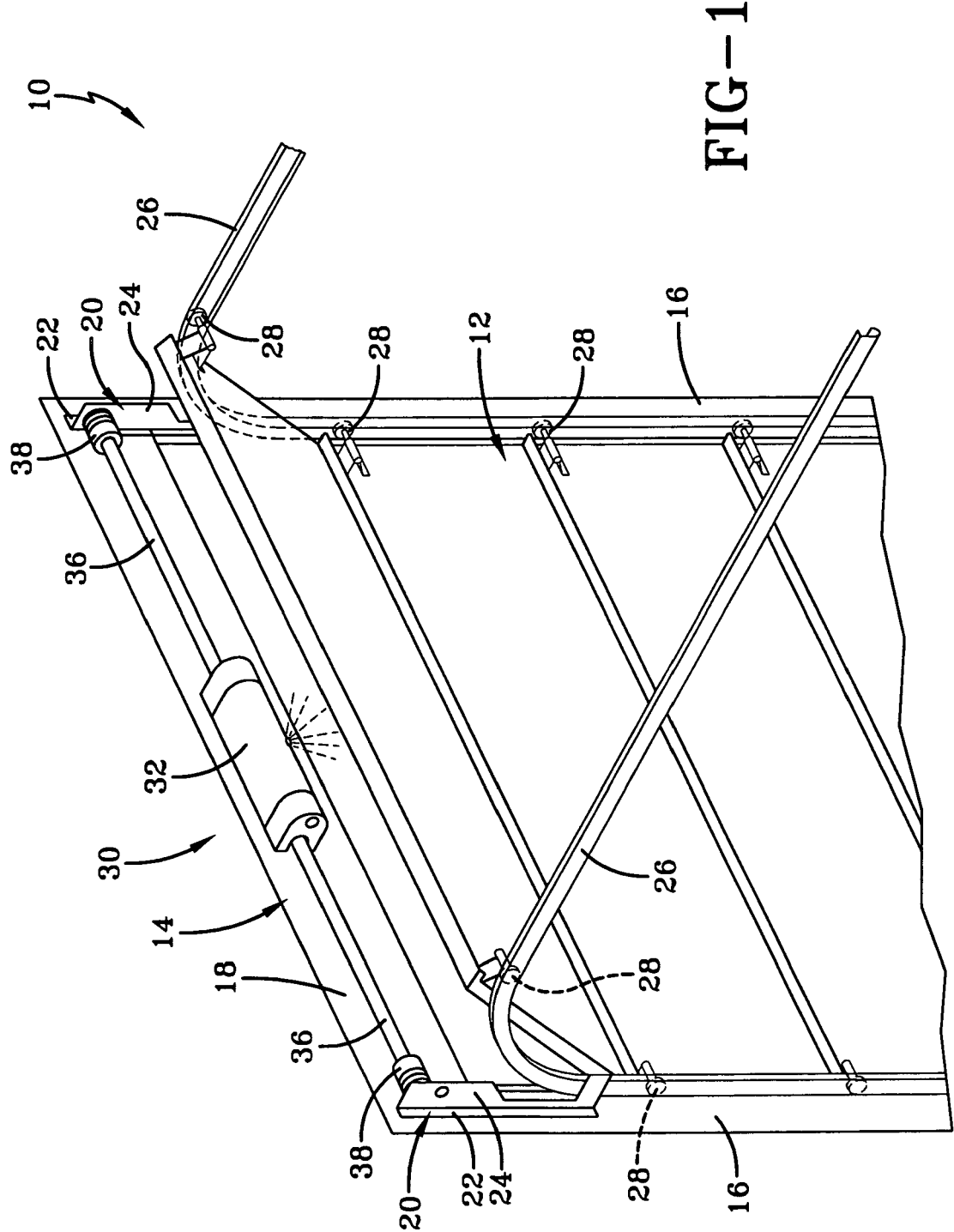
FIG. 1 is a perspective view of the barrier operator and frame to allow the access barrier to move between open and closed positions according to the concepts of the present invention.
Figure 2:
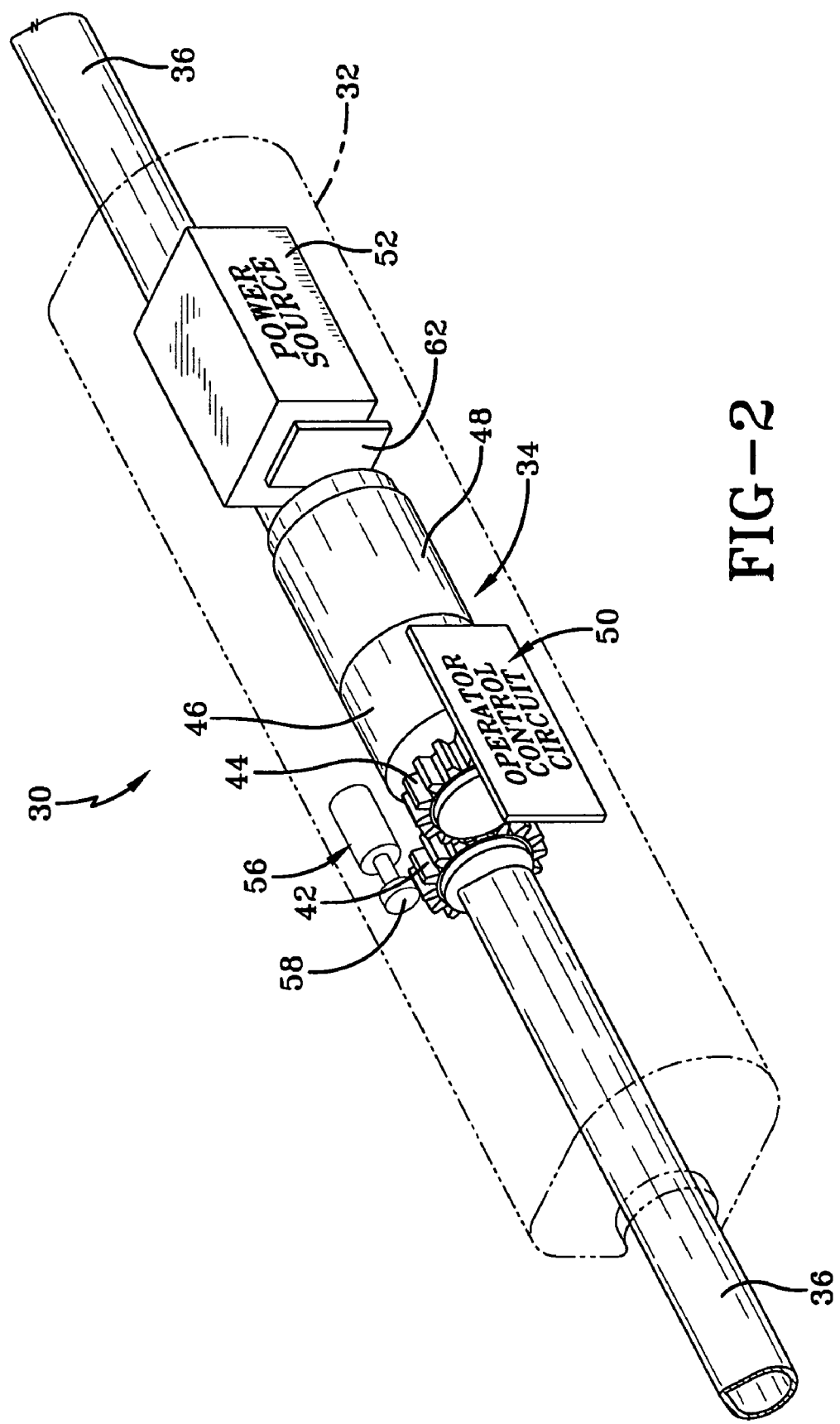
FIG. 2 is a schematic view of the barrier operator according to the concepts of the present invention.

The constant speed barrier operator system according to the present invention is generally designated by the numeral 10 as shown in FIGS. 1-6 of the drawings. Referring to FIG. 1, the system 10 is employed in conjunction with an access barrier 12. Although the following discussion relates to an access barrier 12 comprising a garage door, other moveable barriers such as curtains, gates, awnings, and windows could be used therewith. The opening in which the access barrier 12 is positioned for opening and closing movements relative thereto is surrounded by a frame 14, which consists of a pair of a vertically spaced jamb members 16 that are generally parallel and extend vertically upwardly from the ground (not shown). The jambs 16 are spaced and joined at their vertical upper extremity by a header 18 to thereby form a generally u-shaped frame 14 around the opening for the access barrier 12. The frame 14 is normally constructed of lumber or other structural building materials for the purpose of reinforcement and to facilitate the attachment of elements supporting and controlling the access barrier 12.

Secured to the jambs 16 are L-shaped vertical members 20 which have a leg 22 attached to the jambs 16 and a projecting leg 24, which perpendicularly extends from respective legs 22. The L-shaped vertical members 20 may also be provided in other shapes depending upon the particular frame and access barrier 12 with which it is associated. Secured to each projecting leg 24 is a track 26, which extends perpendicularly from each projecting leg 24. Each track 26 receives a roller 28, which extends from the top edge of the access barrier 12. Additional rollers 28 may also be provided on each top vertical edge of each section of the access barrier 12 to facilitate the transfer of the access barrier 12 between open and closed positions.

A counterbalancing system 30 may be employed to move the access barrier 12 back and forth between open and closed positions. Generally, the counterbalancing system 30 includes a housing 32, which is affixed to the header 18 at about a midpoint thereof and which contains a barrier operator 34 (shown more clearly in FIG. 2). Extending from each end of the barrier operator 34 is a drive shaft 36, the opposite ends of which are received by tensioning assemblies 38 that are affixed to respective projecting legs 24.

The drive shaft 36 provides the necessary mechanical power to transfer the access barrier 12 between opened and closed positions. The drive shaft 36 provides a drive gear 42 at about a midpoint thereof wherein the drive gear 42 is coupled to a motor gear 44. Driving motion of the motor gear 44 is controlled through a gear box 46 and by a motor 48.

An operator control circuit 50, which is contained within the housing 32 of the barrier operator 34, monitors the operation of the motor 48 and various other elements contained within the barrier operator 34, which will be discussed later. A power source 52 is coupled to the drive motor 48 and the operator control circuit 50 to provide the power required for the operation thereof. The power source 52 may comprise a mains power supply, a battery, or any other suitable power source. Mains power as used herein is defined herein as standard commercial power, such as 120VAC for example.

A potentiometer 56 is connected to the drive gear 42 for the purpose of determining positional location of the access barrier 12. To this end, a slider 58 extends from the potentiometer 56 and is coupled to the drive gear 42 to monitor the positional rotation of the drive gear. Based upon the known positional information, barrier movement speed values can also be generated. It should be appreciated that a current sensor 60, shown in FIG. 3, may be employed in lieu of the potentiometer 56 to ascertain the position, including the open and closed positional limits of the access barrier 12. The current sensor 60 monitors the amount of current drawn by the motor and whether the current is increasing or decreasing. The control circuit 50 receives this data from the current sensor 60 which may include detectable current spikes that result from commutator windings or the like. These spikes, and related information, can then be used to generate positional and speed information about the barrier's movement.

A pulse counter 62 is employed to monitor rotation and speed of the access barrier 12. The pulse counter 62 is coupled to the control circuit 50 for the purpose of supplying input thereto. The pulse counter may be in the form of a light emitter coupled with a light receiver, wherein a wheel associated with a rotating component of the operator, such as the drive tube, periodically breaks the light beam. These interruptions are detected by the receiver and transmitted to a controller. Each interruption is associated with a count, wherein a series of counts are used to determine door speed, direction of barrier movement and other operating parameters. Indeed, once the open and close position limits are set, the data generated by the pulse counter can also be used to determine position and speed of the barrier.

Figure 3:
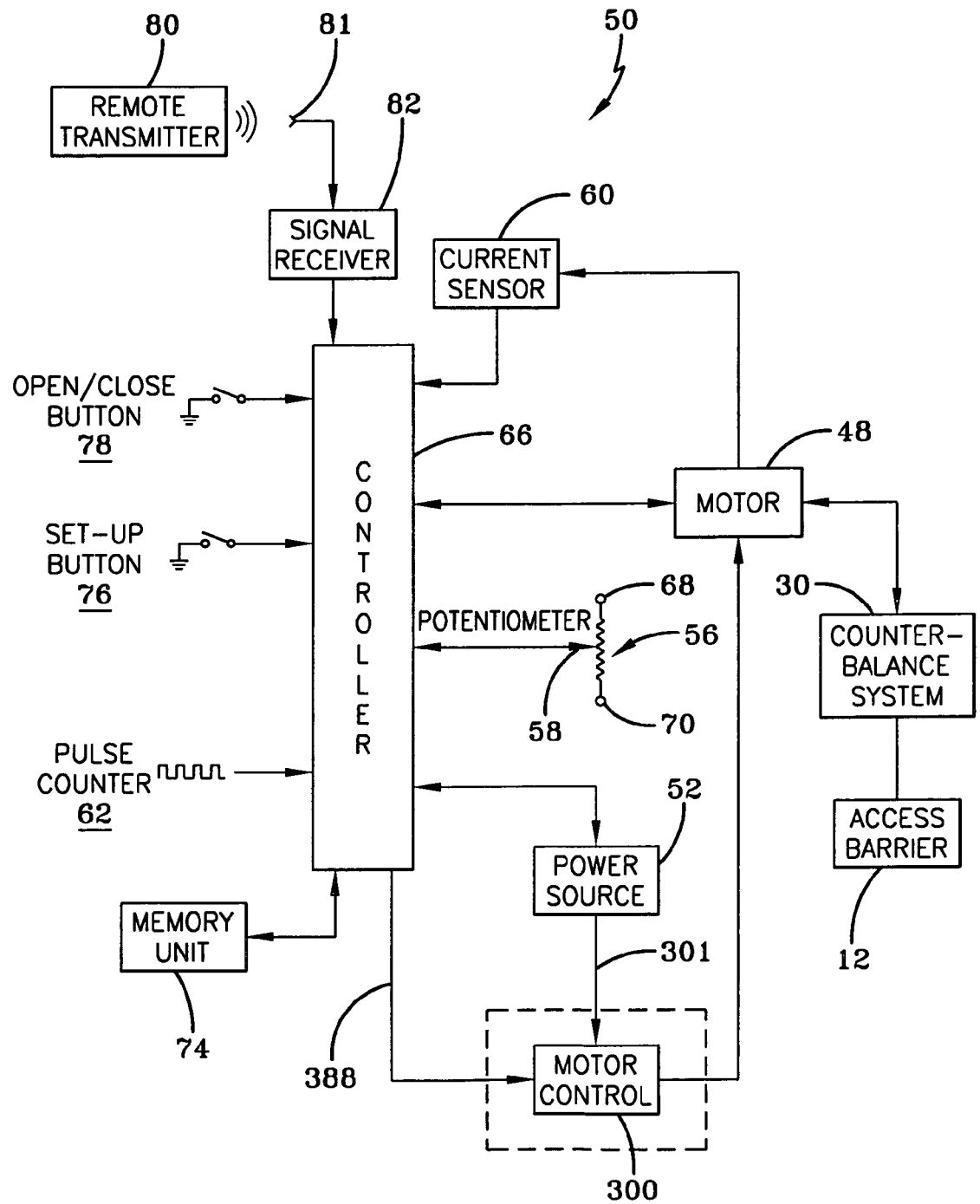
FIG. 3 is a block diagram of the operator control circuit of the barrier operator according to the concepts of the present invention.

Referring now to FIG. 3, it can be seen that the operator control circuit 50 employs a controller 66, which receives power from the power source 52. The controller 66 comprises a logic control that may be implemented using a general purpose or application specific microprocessor/microcontroller that provides the necessary hardware, software, and memory to carry out the functions to be described. It will be appreciated by those skilled in the art that readily available interfacing circuits may be utilized between the controller and the components shown connected directly thereto. One exemplary interfacing circuit is a motor control circuit 300 which will be discussed in detail later. The potentiometer 56 is also coupled to the controller 66 wherein the potentiometer 56 includes a first end point 68 and a second end point 70 with the slider 58 disposed therebetween. In essence, the potentiometer 56 is a variable resistor, wherein the two end points 68, 70 have an electrical potential applied across them. If the slider 58 is moved toward the end point with the positive potential, then the slider voltage becomes more positive. Alternatively, if the slider 58 is moved towards the end point with the negative potential, then the slider voltage becomes more negative. By connecting the slider 58 to the access barrier 12 through the drive gear 42, the potentiometer 56 always outputs a voltage relative to the position of the access barrier 12. That is, the potentiometer 56 will output specific voltage levels corresponding to the various positions that the access barrier 12 moves through during its upward and downward movements. As such, a plurality of positional data samples may be collected from the potentiometer 56 by the controller 66 for subsequent processing, which will be discussed later. If the power source 52, for whatever reason, is removed from the operator control circuit 50, the slider 58 still points to a position relative to the access barrier 12. If a user moves the access barrier 12 while the barrier operator 34 is off, the slider 58 maintains a relative position with respect to the access barrier 12 and is reacquired once power is returned to the barrier operator 34. The current sensor 60 is also connected directly to the controller.

Also connected to the controller 66 is a memory unit 74 for storing various sample data collected from the potentiometer 56 and the pulse counter 62, which will be discussed more fully later. It should be appreciated that the memory unit 74 may comprise non-volatile memory (NVM), volatile memory, or a combination of both. Such NVM memory may comprise eraseable programmable read-only memory (EPROM), electrically eraseable read-only programmable memory (EEPROM), one-time programmable memory (OTP), or other suitable memory. Furthermore, the volatile memory may comprise dynamic random access memory (DRAM), static random access memory (SRAM), or other suitable memory.

Operation of the barrier operator 34 and the operator control circuit 50 is controlled by a set-up button 76, an open/close button 78, and a remote transmitter 80. The remote transmitter 80 is capable of transmitting functions, such as an open/close function for receipt by an antenna 81 provided by the barrier operator 34. A signal receiver 82 is connected to the antenna 81 and converts the received wireless signal into an appropriate format useable by the controller 66.

Generally, the barrier operator 34 utilizes access barrier profile data acquired during a set-up or installation routine mode to determine the appropriate force limits for when the access barrier 12 is opening and for when the access barrier 12 is closing. A new access barrier profile data is saved in the memory unit 74 every time the access barrier 12 is cycled. The access barrier profile data contains the access barrier position and force values applied to the access barrier 12 for a plurality of points during the operation cycle. The potentiometer 56 is employed to detect the position and/or speed of the access barrier 12 throughout its operation cycle. Alternatively, the pulse counter 62 is employed to calculate speed, which is related to a torque value, and/or the barrier position. Force adjustments applied by the barrier operator 34 are automatically set during the set-up routine mode, and as such, no user controls are needed to set the force limits. The only input provided from the user is the actuation of the set-up button 76. Once the set-up routine is complete, an internal entrapment system triggers whenever the force applied exceeds a predetermined threshold for any point throughout the movement of the barrier operator 12. It will be appreciated, however, that different threshold settings are possible by reprogramming the controller 66.

Once the barrier operator 34 is installed and coupled to the access barrier 12, it will be appreciated that there is no access barrier data profile present within the memory unit 74. In order to initially program the access barrier profile data, the installer or user must actuate the set-up routine mode via the set-up button 76, which allows the barrier operator 34 to move the access barrier 12. If the slider 58 is higher than the middle travel position, the potentiometer 56 reading becomes the upper limit. If the slider 58 is lower than the middle travel position, the potentiometer 56 reading becomes the lower limit. Once the initial limit (high or low) is read, the controller 66 commands the barrier operator 34 to move the access barrier 12 up, if the slider position is lower than the middle travel position, or down, if the slider position is higher than the middle travel position.

Once the access barrier profile data is programmed, the user does not need to push the set-up button 76 again, unless the access barrier 12 or counterbalance springs contained within the counterbalancing system 30 are changed. During normal access barrier 12 operation, the user either actuates the open/close button 78 or the remote open/close function provided by the remote transmitter 80 to initiate the actuation of the access barrier.

To maintain the movement of the access barrier 12 at a constant speed, the present system 10 samples the speed, and position of the access barrier 12 during each upward and downward movement. At the end of each movement, the controller 66 compares a predetermined setup speed value with the sampled speed values (the setup speed value is discussed more fully below). If one or more of the sampled speed values does not match the setup speed value, the controller 66 adjusts the motor power for that particular position to compensate for the speed variation. As such, the present system 10 is able to maintain a speed that matches the predetermined setup speed. The process employed by the present system 10 to achieve the constant speed operation of the access barrier 12 is discussed below.

Figure 4:
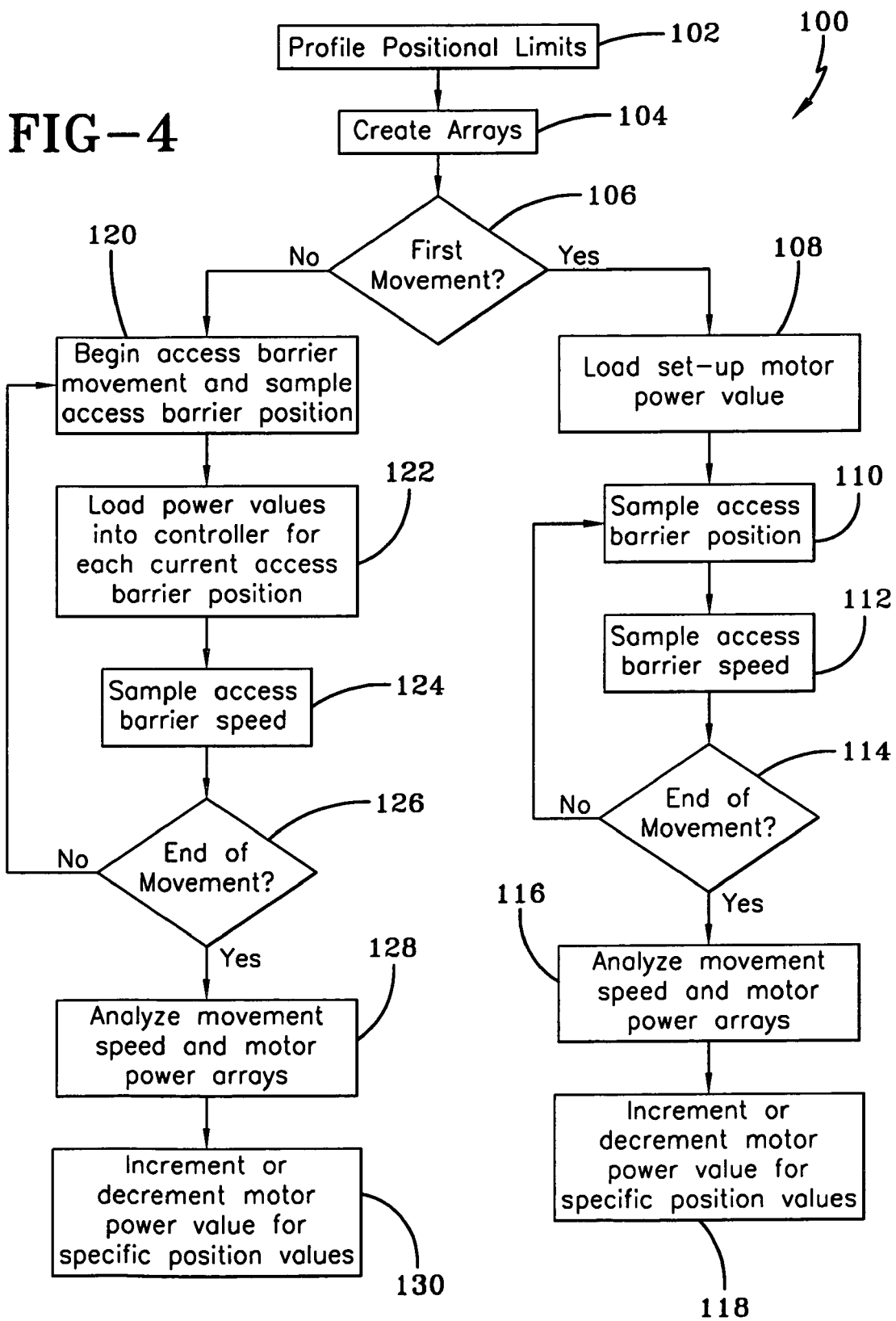
FIG. 4 is a flow chart of the operational steps performed by the constant speed barrier operator to detect, measure, and adjust the operating parameters thereof, according to the concepts of the present invention.

The operational steps taken by the system 10 during an access barrier 12 movement, are designated generally by the numeral 100 in FIG. 4. At step 102, prior to putting the access barrier 12 into operation, the positional limits that define the open and closed positions of the access barrier 12 are profiled and stored into the memory unit 74 provided by the operator control circuit 50. In order for the control circuit 50 to profile or identify the positional limits of the access barrier 12, the user may physically move the access barrier 12 between its open and closed positions. In this case, the access barrier 12 is moved between open and closed positions and the potentiometer 62 outputs voltage levels representing the positional (open/closed) limits of the access barrier 12. In another embodiment, the current sensor 60 may be used to ascertain the positional limits of the access barrier 12. For example, once the user actuates the barrier operator 34, the access barrier 12 will move to either its open or closed position. Once the access barrier 12 arrives at either position, the motor 48 will begin to draw an increased amount of electrical current which will be detected by the current sensor 60, indicating that the access barrier 12 has reached the end of its movement. As such, the current sensor 60 allows the system 10 to automatically ascertain the positional limits of the access barrier 12 during an initial set-up routine. Of course, other measurable parameters could be used to automatically ascertain the positional limits.

Once the positional limits of the access barrier 12 have been stored in the memory unit 74, the controller 66 creates an array 200 in the memory unit 74, as indicated at step 104. As shown in FIG. 5, the array 200 is comprised of an upward array 202, and a downward array 204. The upward array 202 is used by the controller 66 to store data relating to access barrier 12 movements made in the upward direction, while the downward array 204 allows the controller 66 to store data relating to access barrier 12 movements made in the downward direction. Both arrays 202,204 are further divided into sub-arrays that are denoted as: motor power 206, movement speed 208, and movement position 210. The movement position sub-array 210 allows the controller 66 to store a plurality of position values obtained from the potentiometer 56, as the access barrier 12 moves between its positional limits. Additionally, the controller 66 stores a plurality of speed values obtained from the pulse counter 62 in the movement speed sub-array 208. Furthermore, the motor power sub-array 206 allows the controller 66 to store a plurality of motor power values that are used by the controller 66 to actuate the amount of power supplied to the motor 48. More precisely, each position value stored in the position sub-array 210 represents a single discrete position along the path of the access barrier 12 as the access barrier 12 completes an upward or downward movement on the track 26. The number of position values acquired by the potentiometer 56 is determined by the sampling rate established by the controller 66. Furthermore, each individual position value acquired and stored has a speed value and a power value uniquely associated with it. As such, the controller 66 can identify the speed value and motor power value for a given position of the access barrier 12.

Returning to FIG. 4, at step 106 the process 100 determines if it is the first movement of the access barrier 12. If it is the first movement, the process 100 continues to step 108. At step 108, the predetermined setup power value that is selected to achieve a desired setup speed for the access barrier is loaded into the controller 66 from the memory unit 74, and the motor 48 energized to a point corresponding to the setup power value. The magnitude of the setup motor power value is selected to provide a desired setup speed that is suitable for the general operation of access barriers 12. It should be appreciated that the predetermined motor power value may be greater for heavier access barriers 12, and smaller for lighter access barriers 12. Furthermore, it is also contemplated that the predetermined motor power value may be programmed into the memory unit 74 by the manufacturer, or by the user by selecting a suitable mode using setup button 76 provided by the barrier operator 34.

During the first downward or upward movement of the access barrier 12, the controller 66, via the potentiometer 56 begins sampling the position of the access barrier 12, thus generating a plurality of position values as indicated at step 110. The position values are correspondingly stored in the movement position sub-array 210, of either the upward 202 or downward 204 array depending on the movement direction of the access barrier 12. Somewhat simultaneously with step 110, step 112 is performed whereby the controller 66 samples the speed of the access barrier 12 via the pulse counter 62, thus generating a plurality of speed values. Each speed value corresponds to a particular position value or range of position values, with the speed value being stored in the movement speed sub-array 208 of either the upward 202 or the downward 204 array, depending on the movement direction of the access barrier 12. It should be appreciated that position and speed samples may be taken every ¼ in., ½ in., or other suitable distance. It should also be appreciated that any number of position and speed samples may be taken to achieve the data resolution desired, for example 200 samples may be taken during a given access barrier 12 movement. At step 114, the process 100 determines whether the first upward or downward movement of the access barrier 12 has been completed. If the movement is not complete, the process returns to step 110, whereby steps 110-112 are repeated until the movement of the access barrier 12 is completed. Once the movement of the access barrier 12 is completed, the process 100 moves to step 116. Here, the stored movement speed values and motor power values stored in the movement speed and movement power sub-arrays 206,208 are analyzed. Specifically, the sampled speed values associated with a given sampled position value are compared against the setup speed value. If a difference exists between the setup speed value and any individual sample speed value an incremental adjustment is made to the motor power value associated with the particular position value where the speed difference exists, as indicated at step 118. Thus, if a sampled speed value at a particular access barrier 12 position is lower than the set-up speed value, the controller 66 incrementally increases the motor power value for that particular position, so as to compensate for the decreased speed of the access barrier 12. Alternatively, if the sampled speed value at a particular position is higher than the set-up speed value, then the controller 66 incrementally decreases the motor power value for that particular position to compensate for the increase speed of the access barrier 12.

However, if the process 100 determines at step 106 that the access barrier 12 has previously completed one full movement in the direction that the access barrier 12 is currently being moved, then the process 100 proceeds to step 120 instead of step 108. It should be appreciated, however, that the access barrier 12 is required to complete a first movement in both the upward and downward directions. That is, although the access barrier 12 may have completed a first movement in the upward direction, the process 100 does not continue to step 120 during a subsequent first downward movement.

Rather, the process 100 would continue to step 108 during such first downward movement.

At step 120, the access barrier 12 begins its movement, at which time the controller 66 via the potentiometer 56 begins sampling the position of the access barrier 12 as it moves. To collect a suitable number of samples as the access barrier 12 completes its movement, samples may be taken every ¼ inch, every ½, or other suitable distance. Again, the sampled position values serve as an index to identify the speed and motor power values for a given position of the access barrier 12, as previously discussed with respect to steps 110 and 112. These individual position values are correspondingly stored in the movement position array 210 of either the upward 202 or downward 204 array, depending on the direction of the movement of the access barrier 12. Somewhat simultaneously with step 120, step 122 is performed, whereby the controller 66 retrieves individual motor power values stored in the motor power sub-array 206 of the upward or downward array 202, 204. As the access barrier 12 moves through the various points in its movement path, the controller 66 loads the motor power value from the memory unit 74 associated with each given position value. The controller 66 uses the motor power values to modulate the power delivered to the motor 48 to attain the predetermined setup speed for the access barrier 12. Thus, as the access barrier 12 reaches a new position in its movement that corresponds to a stored position value, the motor power may be decreased or increased by the processor 66. As such, the predetermined speed selected for the access barrier 12 is maintained.

Next, at step 124, which is performed somewhat simultaneously with steps 120 and 122, samples are taken by the controller 66 via the pulse counter 62 or equivalent device to measure the speed of the access barrier 12, as previously discussed. Alternatively, the current sensor 60 may be used to detect speed as an increase or decrease in electrical current by the motor 48.

Once the speed samples are taken, the resultant speed values are then stored into the movement speed sub-array 208 of either the upward and downward arrays 202, 204 depending on the movement direction of the access barrier 12. At step 126, the process 100 determines if the access barrier 12 has completed its movement. If the movement is not complete, the process 100 continues to iterate through steps 120, 122, and 124 until the access barrier 12 has completed its upward or downward movement. However, if the movement of the access barrier 12 is complete, then the process 100 continues to step 128.

At step 128, the controller 66 analyzes the speed values stored in the movement speed array 208 for each individual access barrier 12 position that has been sampled. If a variation exists between the predetermined setup speed value established for the access barrier 12, and any of the sampled speed values stored in the movement speed sub-array 208, an adjustment in motor power is made for that specific position, as indicated at step 130. Specifically, the controller 66 may increase or decrease the motor power values for a given position value to compensate for the speed of the access barrier 12 at the same position. For example, if the speed at a specific movement position is below the setup speed, the controller 66 will increase the motor power value for that specific position value. Correspondingly, if the speed at a specific position value is above the setup speed, the controller 66 will decrease the motor power value for that specific position value. Indeed, the power variables may be determined over a range—such as four inches—of barrier travel. In the case of motor current, the maximum value over the range is recorded and stored. Also stored in the profile data is the motor power level which will be "stepped" from one value to the next, as well as the speed determining device rate of change.

Figure 6:
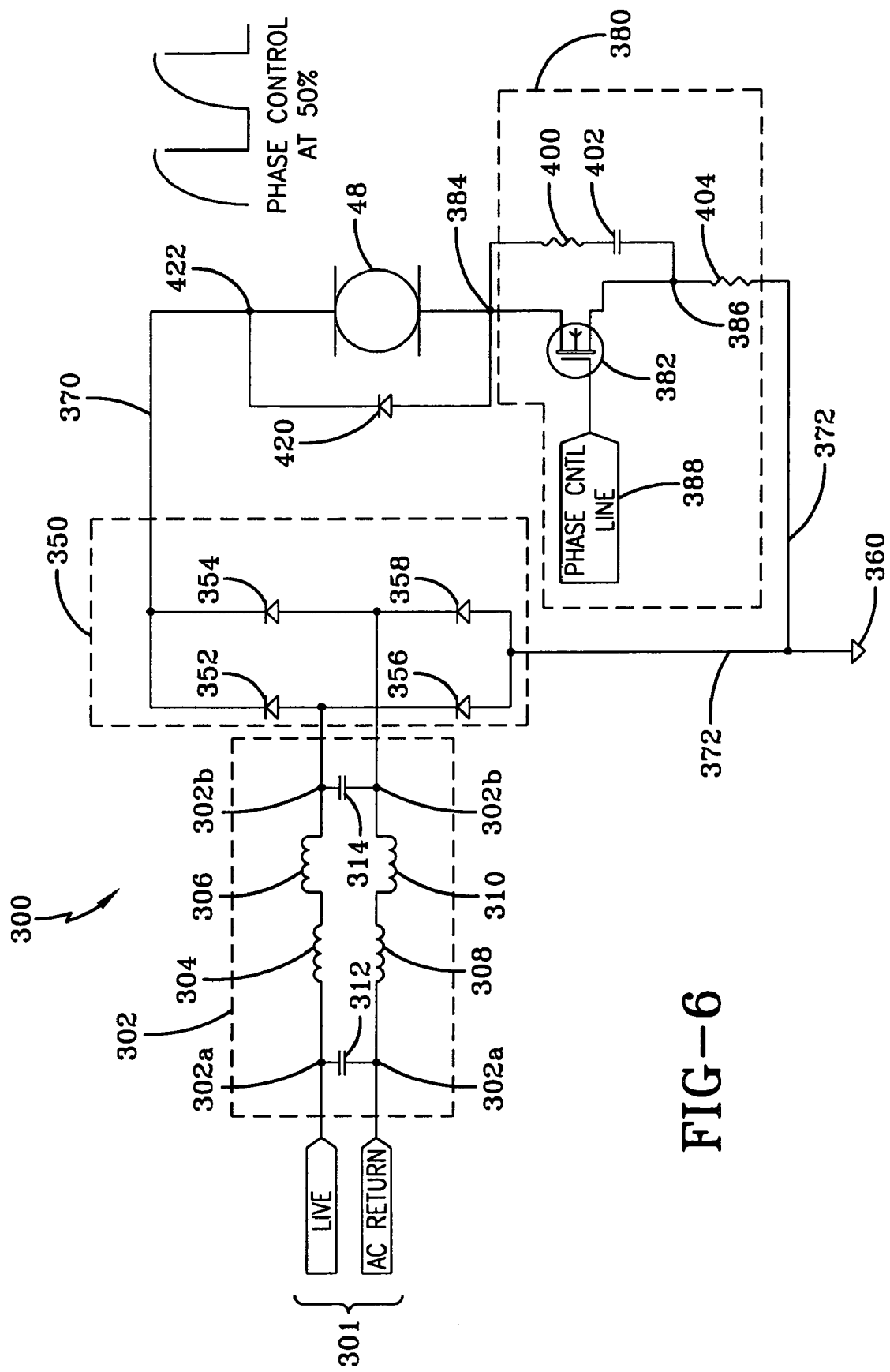
FIG. 6 is a schematic of the motor control used to control the speed of the access barrier, according to the concepts of the present invention.

To control the operation of the motor 48 of the barrier operator 34, a motor control 300 as shown in FIG. 6 is utilized. The motor control 300 utilizes a process referred to as phase control to adjust the amount of power supplied to the motor 48, so as to control the movement speed of the access barrier 12 between open and closed positions. The motor control 300 comprises motor control input lines 301 to receive input power from an AC power source 52, such as a mains power supply. A filter 302 is coupled to the motor control input lines 301, and comprises two (2) sets of series connected inductors 304,306 and 308,310 at nodes 302a and 302b. A capacitor 312 and a capacitor 314 are coupled across each respective end of the corresponding inductor set 304,306 and 308,310. Coupled to the output of the filter 302 is a full-wave rectifier 350 that is capable of converting the AC power input to the motor control 300 into pulsed DC power. It should be appreciated that the full-wave rectifier may comprise a bridge rectifier, or other suitable device that provides a pulsed DC output. The rectifier 350 comprises four diodes 352,354,356, 358, whereby diodes 356 and 358 have their anodes coupled together, and diodes 352 and 354 have their cathodes coupled together. Additionally, diodes 352 and 354 are coupled via their anodes to the cathodes of diodes 356 and 358. A first and a second output line 370 and 372 couple the output of the rectifier 350 to the motor 48, and to a phase control 380.

The phase control 380 allows the motor control 300 to chop the pulsed DC power that is output from the rectifier 350 such that the amount of effective power delivered to the motor 48 can be controlled. The phase control 380 comprises a metal oxide semiconductor field-effect transistor, hereinafter MOSFET 382. The drain of the MOSFET 382 coupled to a node 384, while the source is coupled to a node 386. The controller 66 controls the operation of the phase control 380 by sending suitable control signals to the gate of the MOSFET 382 via a phase control line 388, that is also coupled to the controller 66 (shown in FIG. 3). The phase control 380 also comprises a resistor 400 and capacitor 402 coupled together in a series connection, while their remaining terminals are coupled to nodes 384 and 386 respectively. Additionally, a resistor 404 is coupled to node 386 and is coupled to the output line 372.

In a parallel connection with the motor 48 is a diode 420, whereby the anode of diode 420 is tied to node 384, and the cathode of diode 420 is tied to a node 422. The diode 420 serves as a low impedance path for any induced magnetic field collapsing current generated by the motor 48 when the motor 48 is de-energized. As such, when the motor 48 is de-energized, the rotation of the armature (not shown) of the motor 48 is quickly brought to a stop.

During operation of the phase control 300, AC power is supplied to the filter 302 via the motor control input lines 301. The filter 302 processes the received AC power in a manner to prevent high frequency transients that may be present from entering the rectifier 350, and the remaining portions of the motor control 300. The rectifier 350 converts the AC power into full-wave rectified, or pulsed DC power for supply to the phase control 380. In addition, the controller 66 monitors the input power delivered to the motor control 300 by the input lines 301. The controller 66 monitors the AC power for the point at which the AC power signal transitions from positive to negative, otherwise known as the zero-cross. Once the controller 66 detects a zero-cross, the controller 66 sends a suitable control signal to turn on the MOSFET 382. When the MOSFET 382 is turned on, the pulsed DC power supplied by the rectifier 350 is directly routed through the MOSFET 382 to the motor 48. After a predetermined time period passes, the controller 66 sends a second control signal via the phase control line 388 to turn off the MOSFET 382. As such, the pulsed DC power supplied by the rectifier 350 is routed through the capacitor 402 and resistor 400, where the pulsed DC power is dissipated until the MOSFET 382 is turned on again. By adjusting the amount of time delay between turning on and off of the MOSFET 382, the phase of the pulsed DC power can be altered, thus allowing the amount of power delivered to the motor 48 to be controlled. For example, by providing a time delay between the turning on and off of the MOSFET 382, the amount of power supplied by the rectifier 350 to the motor 48 may be reduced by fifty percent (50%). In this way, power can be selectively applied based upon observed characteristics of the barrier as it moves.

It will, therefore, be appreciated that one advantage of one or more embodiments of the present system is that an access barrier may be moved between open and closed positions with constant speed. Still another advantage of the present system is that as the component parts comprising the access barrier wear, the barrier operator can compensate for the additional resistance by increasing the output of the motor at discrete points in the access barrier's 12 movement, thus allowing the access barrier to maintain a constant speed throughout its useful life. Yet an additional advantage of the present system is that the access barrier is not subjected to any overshoot, undershoot, or oscillation which may damage the access barrier, and detracts from the overall aesthetic appearance of the access barrier.

Although the present invention has been described in considerable detail with reference to certain embodiments, other embodiments are possible. Therefore, the spirit and scope of the appended claims should not be limited to the description of the embodiments contained herein.

What is claimed is:

1. An open-loop constant speed barrier operator to maintain movement of an access barrier, the operator comprising:
   a motor adapted to be linked to the access barrier which moves between opened and closed limit positions;
   a detection device associated with one of said motor and the access barrier, said detection device generating at least one measured position value during movement of the access barrier; and
   a controller coupled to said motor, said controller generating a measured speed value from each said measured position value, said controller maintaining a barrier speed profile that includes a predetermined speed value associated with each said measured position value, said controller adjusting motor power after the access barrier has moved to either of the opened or closed limit position, such that the speed of subsequent access barrier movements at each measured position substantially match the predetermined speed value maintained by the barrier speed profile.

2. The operator according to claim 1, wherein said detection device comprises:
   a pulse counter associated with said motor to generate said speed value and said position value.

3. The operator according to claim 1, wherein said detection device comprises:
   a potentiometer associated with one of said motor and the access barrier to generate the position value, wherein said controller generates said speed value based upon changes in said position value.

4. The operator according to claim 1, wherein said detection device comprises:
   a current sensor associated with said motor to generate said position value, wherein said controller generates said speed value based upon changes in said position value.

5. The operator according to claim 1, further comprising:
   a memory unit associated with said operator for storing said maintained barrier speed profile.

6. The operator according to claim 5, wherein said memory unit comprises:
   a movement position sub-array and a movement speed sub-array;
   said controller receiving said position value and storing said position value in said movement position sub-array, said controller storing said speed value in said movement speed sub-array, and comparing said position value and said speed value to the maintained barrier speed.

7. The operator according to claim 6, wherein said memory unit further comprises:
   a motor power sub-array which contains variations between the maintained barrier speed and said speed values for corresponding position values.

8. The operator according to claim 7, wherein said controller adjusts power generated by said motor according to values stored in said motor power sub-array.

9. The operator according to claim 8, wherein said sub-arrays are further segmented into arrays for travel of the barrier in a first direction and travel of the barrier in a second direction.

10. The operator according to claim 1, further comprising:
    a motor control coupled to said controller and said motor, said motor control comprising:
    a filter;
    a full-wave rectifier coupled to said filter;
    a phase controller coupled to said full-wave rectifier and to said motor, said phase controller having a phase control line to receive a control signal from said controller, whereby in response to said control signal, said phase control adjusts the amount of power delivered to said motor.

11. The operator according to claim 1, further comprising:
    a counterbalance system linked to said motor by a drive shaft.

12. An open-loop constant speed barrier operator to monitor the movement of an access barrier between opened and closed limit positions so as to maintain the movement of the access barrier at a predetermined speed value, the constant speed barrier operator comprising:
    a controller;
    a pulse counter coupled to said controller, said pulse counter configured to provide data on the speed of said access barrier;
    a potentiometer coupled to said controller, said potentiometer configured to provide data on the position of said access barrier;
    a memory unit coupled to said controller, said memory unit having an upward array and a downward array, said upward and downward arrays comprising:
    a movement position sub-array;
    a motor power sub-array; and
    a movement speed sub-array;
    said controller sampling the data provided by said potentiometer and said pulse counter to generate a speed value that is associated with said position value, said controller storing both said position value in said movement position sub-array, and said speed value in said movement speed sub-array, wherein after the movement of the access barrier to either of the opened or closed limit position, said controller compares said speed value with the predetermined setup speed value, such that if a variation is found, said controller stores an updated motor power value associated with said position value and said speed value in said motor power sub-array.

13. The constant speed barrier operator according to claim 12, further comprising
a motor coupled to said controller.

14. The constant speed barrier operator according to claim 13, wherein said motor changes speed according to the magnitude of said motor power value.

15. The constant speed barrier operator according to claim 14, further comprising
a motor control coupled to said controller and said motor.

16. The constant speed barrier operator according to claim 15, wherein said motor control comprises:
a filter;
a full-wave rectifier coupled to said filter;
a phase controller coupled to said full-wave rectifier and to said motor, said phase control having a phase control line to receive a control signal from said controller;
whereby in response to said control signal, said phase control adjusts the amount of power delivered to said motor.

17. The constant speed barrier operator according to claim 15, wherein said motor control utilizes phase control to control the speed of said motor.

18. The constant speed barrier operator according to claim 12, further comprising:
a counterbalance system linked to said motor by a drive shaft.

19. A method for controlling the movement of an access barrier at a predetermined setup speed during the movement of the access barrier to an opened or closed limit position, the method comprising:
providing an open-loop barrier operator having a memory unit coupled to a controller;
creating at least one array in said memory unit,
sampling the position of said access barrier to generate a position value;
determining the speed of the access barrier from said position values obtained at the sampling step;
storing the sampled position and speed sample values in said array;
comparing said sampled speed values associated with a given position value with a predetermined setup speed value after said access barrier has moved to either of the opened or closed limit positions; and
adjusting a motor power value associated with a given position sample value if said sample speed value does not match said predetermined setup speed value.

20. The method according to claim 19, wherein said motor power value is decreased if said sampled speed value is greater than said predetermined setup speed value.

21. The method according to claim 19, wherein said motor power value is increased if said sampled speed value is less than said predetermined setup speed value.

22. The method according to claim 19, wherein said arrays comprise an upward and a downward array.

23. The method according to claim 22, wherein said upward array comprises a motor power sub-array, a movement speed sub-array, and a movement position sub-array.

24. The method according to claim 22, wherein said downward array comprises a motor power sub-array, a movement speed sub-array, and a movement position sub-array.

25. The method according to claim 19, wherein said position sampling step is performed by a potentiometer.

26. The method according to claim 19, wherein said position sampling step is performed by a current sensor.

27. The method according to claim 19, wherein said speed sampling step is performed by a pulse counter.

28. The method according to claim 19 comprising:
providing a motor coupled to said controller.

29. The method according to claim 28, wherein said motor is controlled by a motor control coupled to said motor and said controller.

30. The method according to claim 29, wherein said motor control utilizes phase control to control the speed of said motor.

31. The method according to claim 29, wherein said motor control comprises:
a filter;
a full-wave rectifier coupled to said filter;
a phase controller coupled to said full-wave rectifier and to said motor, said phase control having a phase control line to receive a control signal from said controller;
whereby in response to said control signal, said phase control adjusts the amount of power delivered to said motor.

32. The method according to claim 28 comprising:
linking a counterbalance system to said motor.

* * * * *